United States Patent [19]
Fox

[11] Patent Number: 5,450,687
[45] Date of Patent: Sep. 19, 1995

[54] BITE INDICATOR

[75] Inventor: Clifford R. Fox, Chelmsford, United Kingdom

[73] Assignee: Fox Design International Limited, Chelmsford, England

[21] Appl. No.: 164,948

[22] Filed: Dec. 10, 1993

[30] Foreign Application Priority Data

Dec. 15, 1992 [GB] United Kingdom ............ 9226148

[51] Int. Cl.⁶ .............................................. A01K 97/12
[52] U.S. Cl. .................................................... 43/17
[58] Field of Search ............... 43/17, 15, 16, 19.2, 43/21.2, 43.13, 43.12, 44.88

[56] References Cited

U.S. PATENT DOCUMENTS 4,428,142  1/1984  Shedd et al. .................. 43/44.88
4,679,345  7/1987  Hall ............................... 43/17

FOREIGN PATENT DOCUMENTS

0422913  4/1991  European Pat. Off. .

*Primary Examiner*—Mark Rosenbaum
*Assistant Examiner*—Jeanne Elpel
*Attorney, Agent, or Firm*—Dickinson, Wright, Moon, Van Dusen & Freeman

[57] ABSTRACT

A bite indicator for indicating a bite by a fish on a line of a fishing rod includes an arm that is free to swing upward or downward and a line engagement device secured to the arm for engaging the line. A change in the tension on the line causes the line engagement device to rise or fall as the arm swings upward or downward. The line engagement device includes a body provided with a channel and a pivoting gate that pivots between closed and open positions. In the closed position the gate extends over the channel to form a closed loop with the body that surrounds the line when the bite indicator is in use. In the open position the line is free to move out of the channel. The body is oriented with respect to the arm so that the line tends to open the gate only after the arm swings to an upper position beyond a predetermined level.

13 Claims, 7 Drawing Sheets

BITE INDICATOR

The present invention relates to a bite indicator for use in indicating a bite made by a fish on a line of a fishing rod.

EP-A-0,422,913 proposes a bite indicator comprising a pivoting arm attached at one end to a bank stick which in turn is fixed into the ground. The arm at its opposite end to the pivot point has a head formed from plastics material, with means to attach it to a fishing line, whereby the arm hangs in place. Therefore when a fish causes movement of the line forwards or backwards, the arm then pivots upwards or downwards accordingly. In devices previously proposed in the aforementioned patent specification, the means of engagement of the line with the arm generally comprise a peg resting on the line.

Another previously proposed means of engagement is a mechanical clip comprising two balls at respective free ends of a "U" shaped component made of a resilient plastics material, with the two balls resting against each other. The line of a fishing rod passes through the "U", inwardly of the balls. A rubber ring surrounds both arms of the "U" to urge the two balls more strongly towards one another in order to hold a line more firmly in place. Adjustment of this rubber ring towards or away from the balls causes the release tension to be varied. This is important as the tension has to vary with the amount of weight being placed on the line by the arm.

A problem encountered with this type of engagement means is that the line can be trapped between the balls. Such a jamming may occur when the rod is lifted and the line is intended to snap mechanically between the two balls in order to release the line. However, because of the roundness of the balls, the line may become trapped between them even before a strike, in which case longitudinal movement of the line may be inhibited, so that detection of such movement by another bite indicator arranged for such detection may be impaired. Furthermore these problems cause damage to the line as well as increasing the release friction for the line.

An aim of the present invention is to reduce the extent to which a bite indicator suffers from one or more of the foregoing disadvantages.

Accordingly the present invention is directed to a bite indicator, for use in indicating a bite made by a fish on a line of a fishing rod, comprising an arm which is free to swing upwardly and/or downwardly, and line engagement means which are secured to the arm and which are adapted to engage such a line when the indicator is in use, whereby a slackening or a tightening of the line will cause the line engagement means to drop or rise as the arm swings downwardly or upwardly, in which the line engagement means comprises a body which is provided with a channel and a pivotable gate which is pivotable between a closed position in which it extends over the channel, to form a closed loop with the said body that surrounds such a line when the bite indicator is in use, and an open position in which such a line is free to move out of the channel, the body being so oriented relative to the arm that such a line tends to open the gate only after the arm swings to a position in an upward direction beyond a predetermined level.

This has the advantage that when a strike occurs the bite indicator is automatically disengaged allowing the angler immediate freedom to get on with catching the fish. Also the bite indicator automatically disengages when the rod is lifted up by the angler for actions such as recasting.

It is preferable that the gate can be moved by finger pressure, so as to open it, thus allowing entry of the line, and then to close it so that the engagement means complete a loop around the line.

Advantageously resistance means are provided on the engagement means whereby a predetermined torque needs to be applied to the gate in order to open it.

The resistance means may be adjustable to vary the torque required to open the gate.

Alternatively, or in addition, the orientation of the engagement means relative to the arm may be adjustable to vary the level to which the arm must be raised before such a line will open the gate.

In one advantageous embodiment, the gate is provided with a rounded saddle shape on its side which faces the channel when the gate is in its closed position.

In a further advantageous embodiment, the said body is provided with a rounded saddle shape at the base of the channel.

Preferably, the gate and/or the said body has a narrowed neck portion, at parts thereof adjacent to such a line when the indicator is in use.

It is preferable for the material of the gate to comprise a low friction material, or to be coated with such a material. For example, the gate may be made of aluminium which is chromium plated so as not to cause undue wear on the line. However, the gate could alternatively be made of a material which comprises a plastics material or a ceramics material.

An example of a bite indicator made in accordance with the present invention is illustrated in the accompanying drawings, in which.

Figure 1:
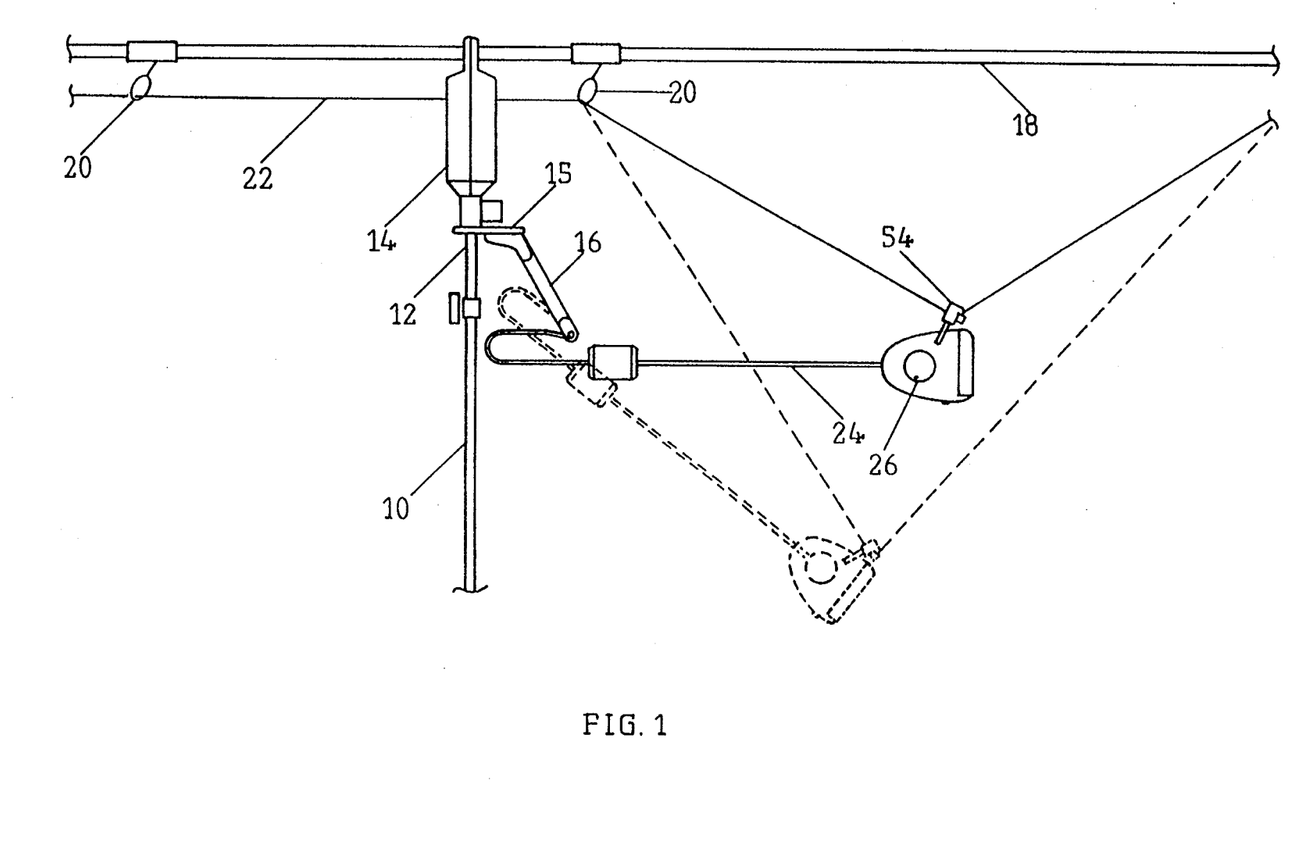
FIG. 1 shows an elevational side view of the bite indicator in use with a fishing rod and support stick assembly.

The fishing rod assembly shown in FIG. 1 comprises a bank stick 10 at the top of which is provided an internally screw-threaded portion 12 by means of which a rod rest head 14 is secured with an attachment part 15 of a bite indicator clamped therebetween. A pivot member 16 is attached by means of a dovetail joint, to the attachment part 15. A fishing rod 18 is supported by the rod rest head 14. The rod 18 is provided with line rings 20 secured to the rod 18 at positions spaced apart therealong, with the fishing rod line 22 threaded through those rings 20 which thereby act as guides therefor. A stainless steel wire arm 24 extends forwardly from the pivot member 16, and is pivotally attached thereto at one end of the arm, there being a head 26 of the bite indicator which is secured to the other end of the arm 24, and which has a line engagement means 54 holding the line 22 of the fishing rod 18, at a position between two rings 20 (only one of which is shown in FIG. 1), to create a "V" shape in the line. As a result, any increased tension in the line 22 will lift the head 26 in an upward direction, whereas any slackening of the tension in the line 22 will result in a fall of the head 26. Any bite made by a fish on the line of the fishing rod will thereby be indicated, irrespective of whether it results in an increase or decrease in the tension in the line.

The bite indicator may be arranged with its arm 24 directed towards the free end of the fishing rod, but preferably it is directed towards the hand grip end thereof.

Figure 2:
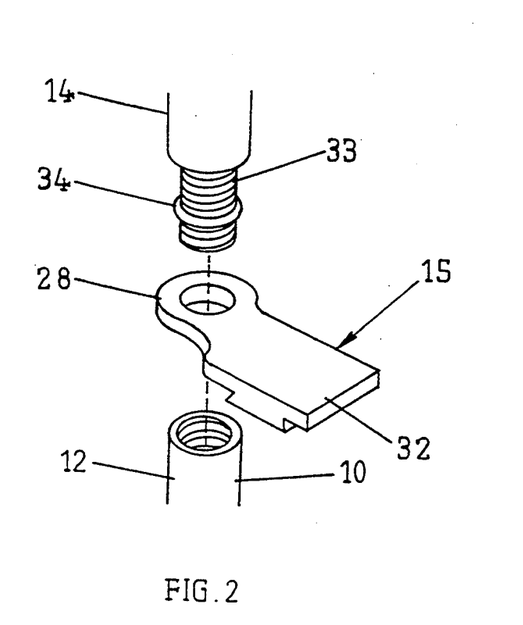
FIG. 2 shows an exploded perspective view of an attachment part for a pivot member of the indicator, together with a rod rest head of the assembly shown in FIG. 1.

The attachment part 15 of the bite indicator is shown in greater detail in FIG. 2, and comprises a plastics injection moulding. It comprises a bank-stick-connecting portion 28 in the form of a closed ring, and a joint section 32 which is provided with the male part of a dovetail joint. The attachment part 15 is clamped to the bank stick in the manner shown in FIG. 2. Thus the rod rest head 14 has an external screw-threaded shank 33 which screws into the internal screw-threaded portion 12 at the top of the bank stick 10. The portion 28 of the attachment part 15 is positioned so that it receives the shank 33 of the rod rest head, and the portion 28 is clamped between the rod rest head 14 and the upper end 12 of the stick 10 via at least one washer 34.

Figure 3:
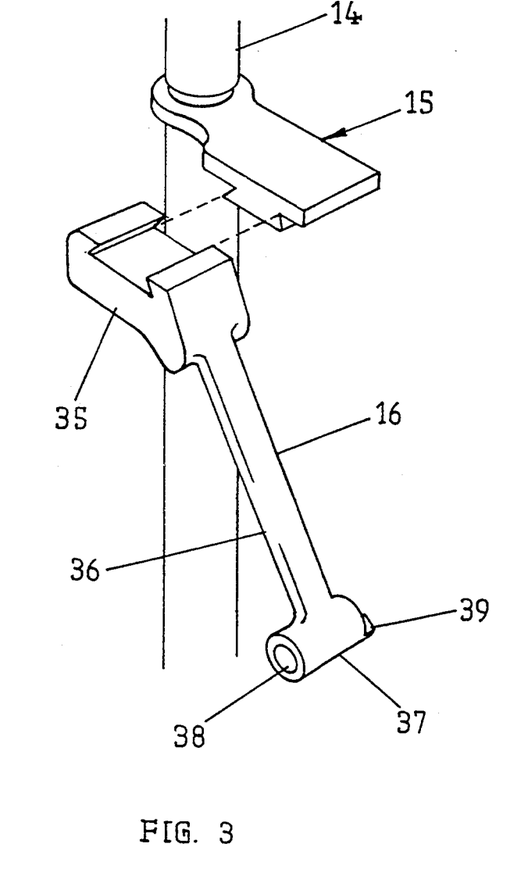
FIG. 3 shows a perspective view of the assembly shown in FIG. 2, together with such a pivot member.

The pivot member 16 of the bite indicator is shown in greater detail in FIG. 3. It comprises a joint portion 35, which is provided with the female part of the dovetail and which fits on to the attachment part 15, and an intermediate portion 36 which slants downwardly from the joint portion 35 to an intended lower end. The latter is provided with a generally tubular portion 37 having an internal bore 38 which is transverse to the intermediate portion 36. A projection 39 is formed at one end and on a lower part of the portion 37 to provide support for the pivot end of the arm 24.

Figure 4:
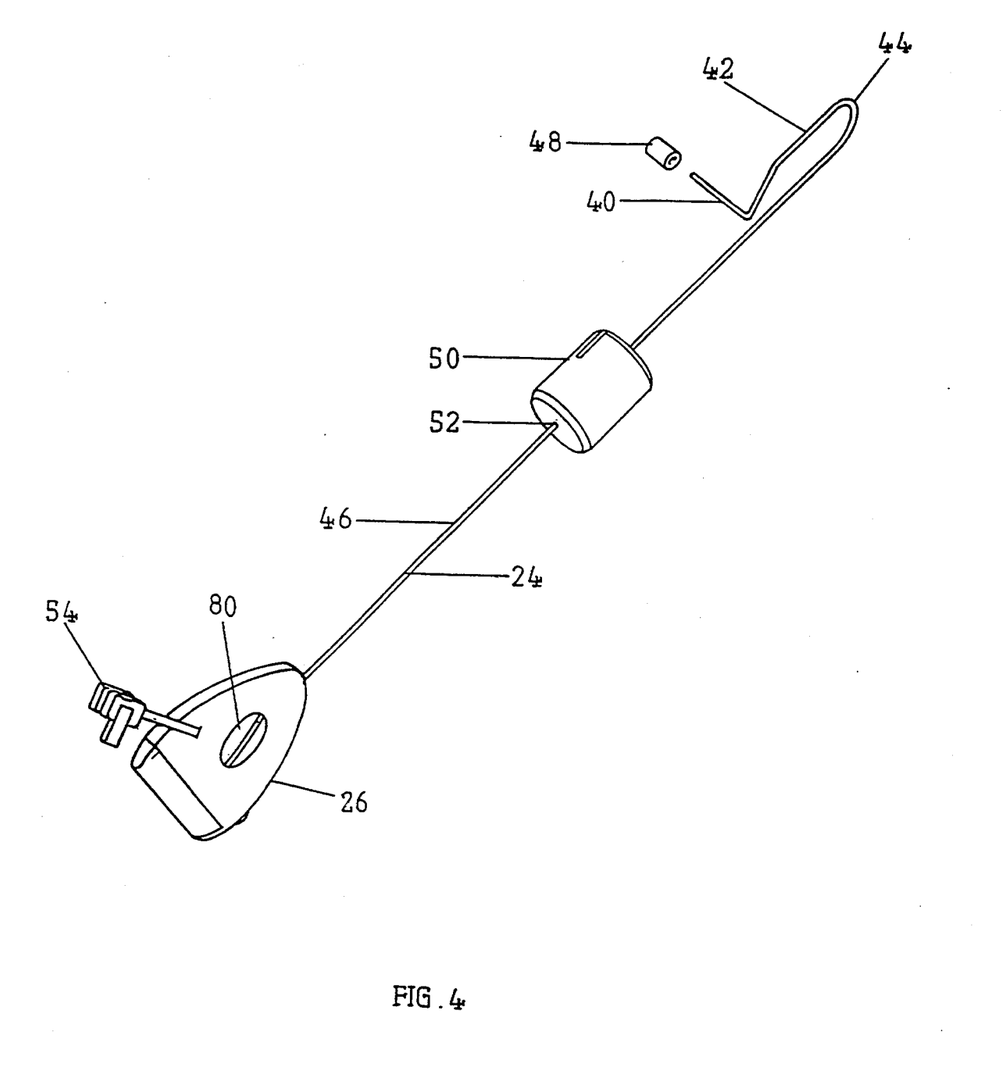
FIG. 4 shows a perspective view of an arm of the bite indicator shown in FIG. 1.

The arm 24 of the bite indicator is shown in greater detail in FIG. 4. It comprises a length of stainless steel wire of about 1/16 inch or 60 thou (1.6 mm) thickness which is so bent as to have a transverse pivot portion 40 at an intended pivot end thereof, a length 42 which is at substantially 90° to the pivot portion 40 and which extends in an intended rearward direction therefrom, a 180° U-bend 44 into an intended forwardly directed main portion 46 which extends from the U-bend 44, beyond the transverse pivot portion 40, to the head 26 of the bite indicator. The overall length of the arm is about 9 inches (229 mm). The transverse pivot portion 40 of the arm 24 extends through the bore 38 of the pivot member 16, the free end of that portion 40 being capped by an end-stop 48 to prevent the arm's transverse pivot portion 40 slipping out of the pivot member 16 whilst at the same time leaving it free to rotate relative thereto about its own axis. A cylindrical or other suitably shaped metal weight 50 through which extends an axial throughbore 52 is threaded onto the main portion 46 of the arm 24 and slid forwardly or rearwardly to adjust the downward force of the head 26 on the line 22. If the weight is slid to a position which extends on the other side of the pivot point to that of the head of the bite indicator, it will reduce the downward force of the head 26 on the line 22 possibly even to a zero value.

The head 26 is comprised of two interlocking halves. On the intended upper surface of the head 26 is mounted a line engagement device 54. The line engagement device 54 has two protrusions on its stem which are pivotably held between the two halves of the head 54. This allows the line engagement means 54 to move from side to side for ease of disengagement of the fishing line upon a sideways strike.

Figure 5:
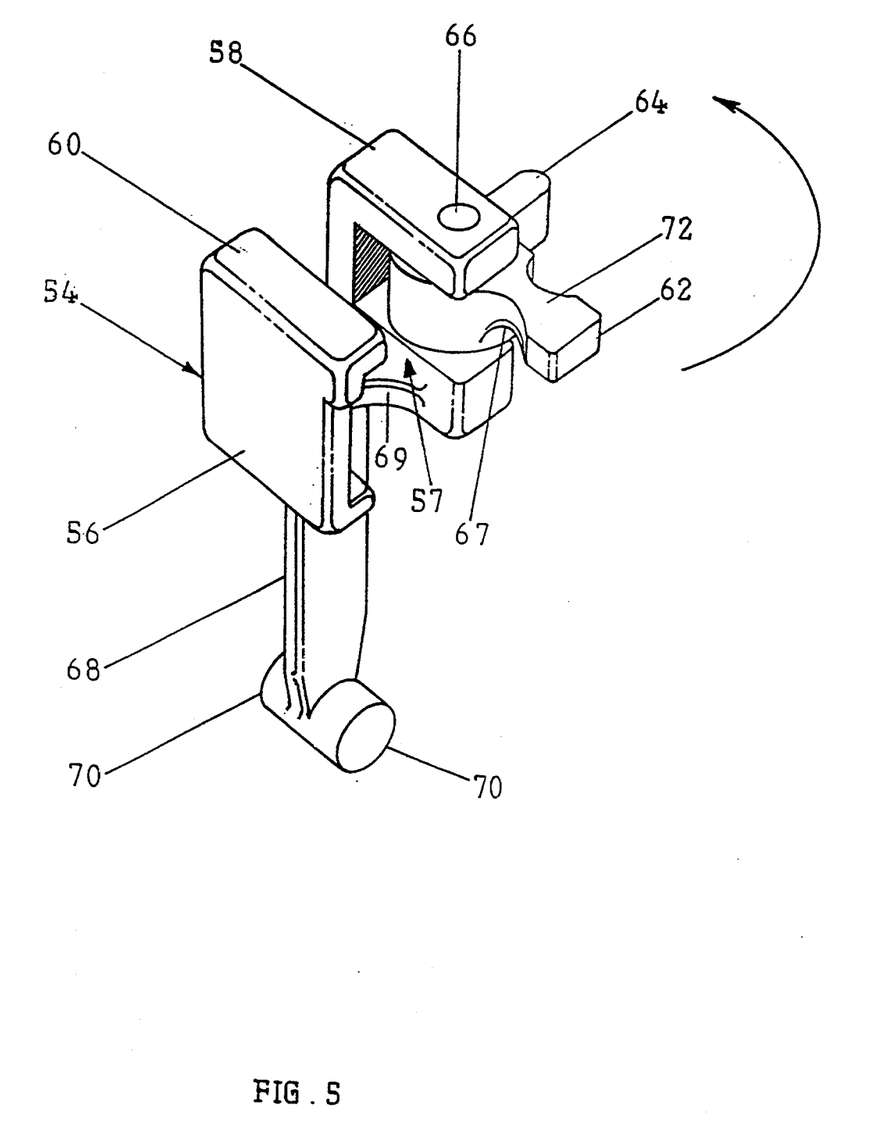
FIG. 5 shows a perspective view of line engagement means of the bite indicator shown in FIG. 1, with a gate of the engagement means in an open position.
Figure 6:
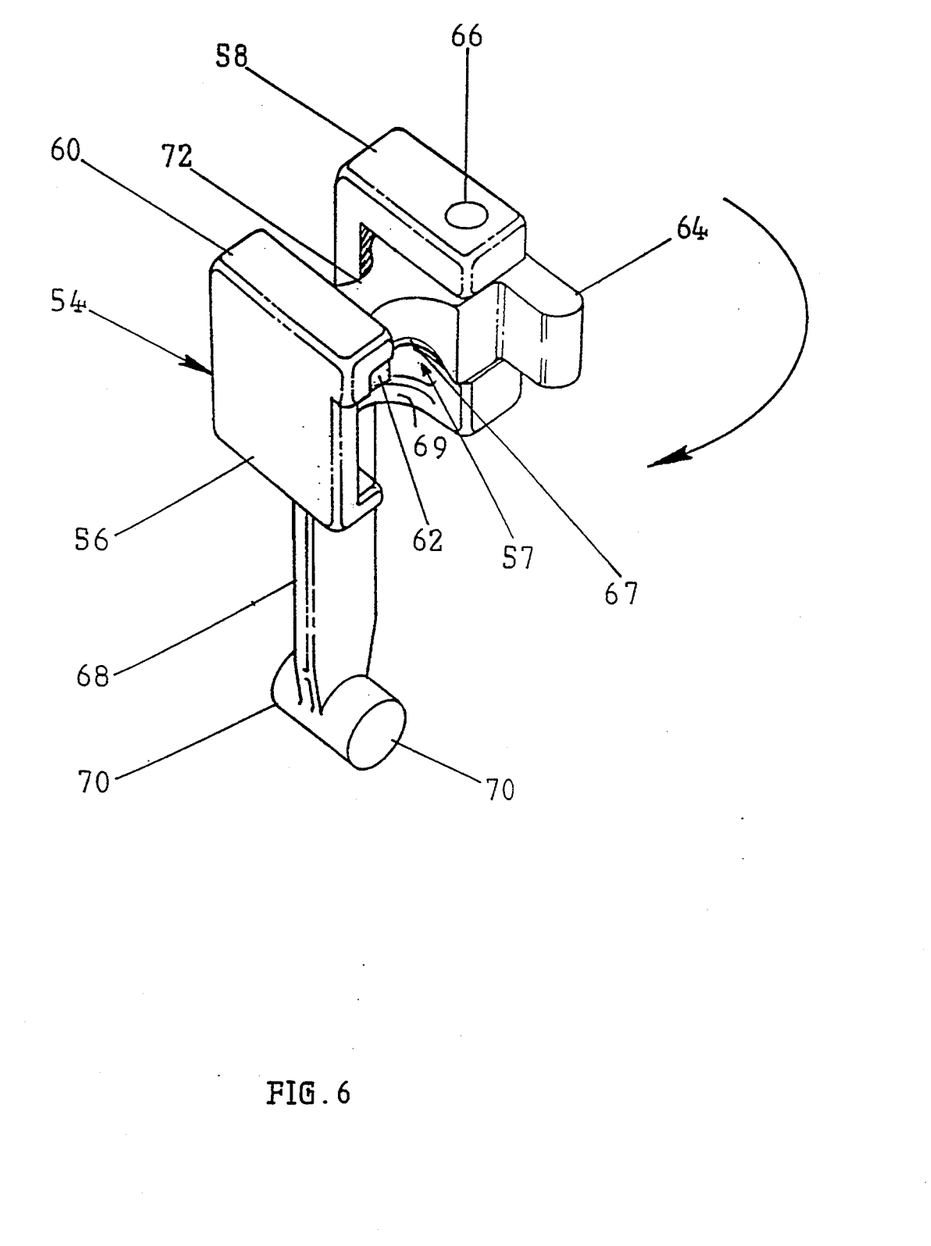
FIG. 6 shows a perspective view of the line engagement means shown in FIG. 5 with the gate in a closed position.

The line engagment device 54 is shown in greater detail in FIGS. 5 and 6. It comprises a generally U-shaped body 56 defining a channel 57 between the arms of its U-shape. The arms of the U-shaped body 56 comprise an L-shaped arm 58 and a scoop-shaped arm 60. The L-shaped arm 58 and the base of the body 56 form a further U-shape between which is pivotably held a base end of a pivotable gate 62. The length of the gate 62 is such that when it is pivoted into a position in which it extends across the U of the body 56 it engages the scoop-shape of the arm 60.

The gate 62 has a knob 64 extending from the base end of the gate at right-angles to the main length of the gate, which knob 64 can be engaged by the thumb or a finger and used to swing the gate in and out of its closed position. The gate 62 swings on a pivot member 66 which passes through the base of the body 52, the base end of the gate 62, and the arm 58.

The gate 62 may fit relatively tightly in the arm 60, to provide a resistance to an opening of the gate 62, and pivot member 66 may have a screw-threaded engagement with the arm 58, so that a tightening of the member 66 increases the torque required to open the gate 62.

The edges of the body 56 are all rounded particularly the corners. The part of the gate 62 which, when the gate 62 is shut, bridges the space between the two arms 60 and 58, is flat on an intended outer surface and concavely rounded on its other faces, particularly its intended lower surface, to provide a smooth surface for the fishing line 22 to move over. To assist such movement of the line further, the gate 62 has a narrowed neck portion 67 at a central region thereof, which neck portion has a rounded saddle shape on its interior side facing the channel when the gate is in its closed position. Likewise, the base of the body 56 has a narrowed central neck portion 69 which also has a rounded saddle shape on its interior side facing the gate.

The base of the body 56 has a stem 68 which protrudes in an intended generally downward direction and is equipped with two protrusions 70 which pivotally hold the line engagement device in the head of the bite indicator, with the arms of the U-shaped body 56 oriented generally in the same direction as the arm 24 of the bite indicator.

The line engagement device is preferably made from pressure die cast aluminium which has been chromium plated so as to reduce friction.

Figure 7:
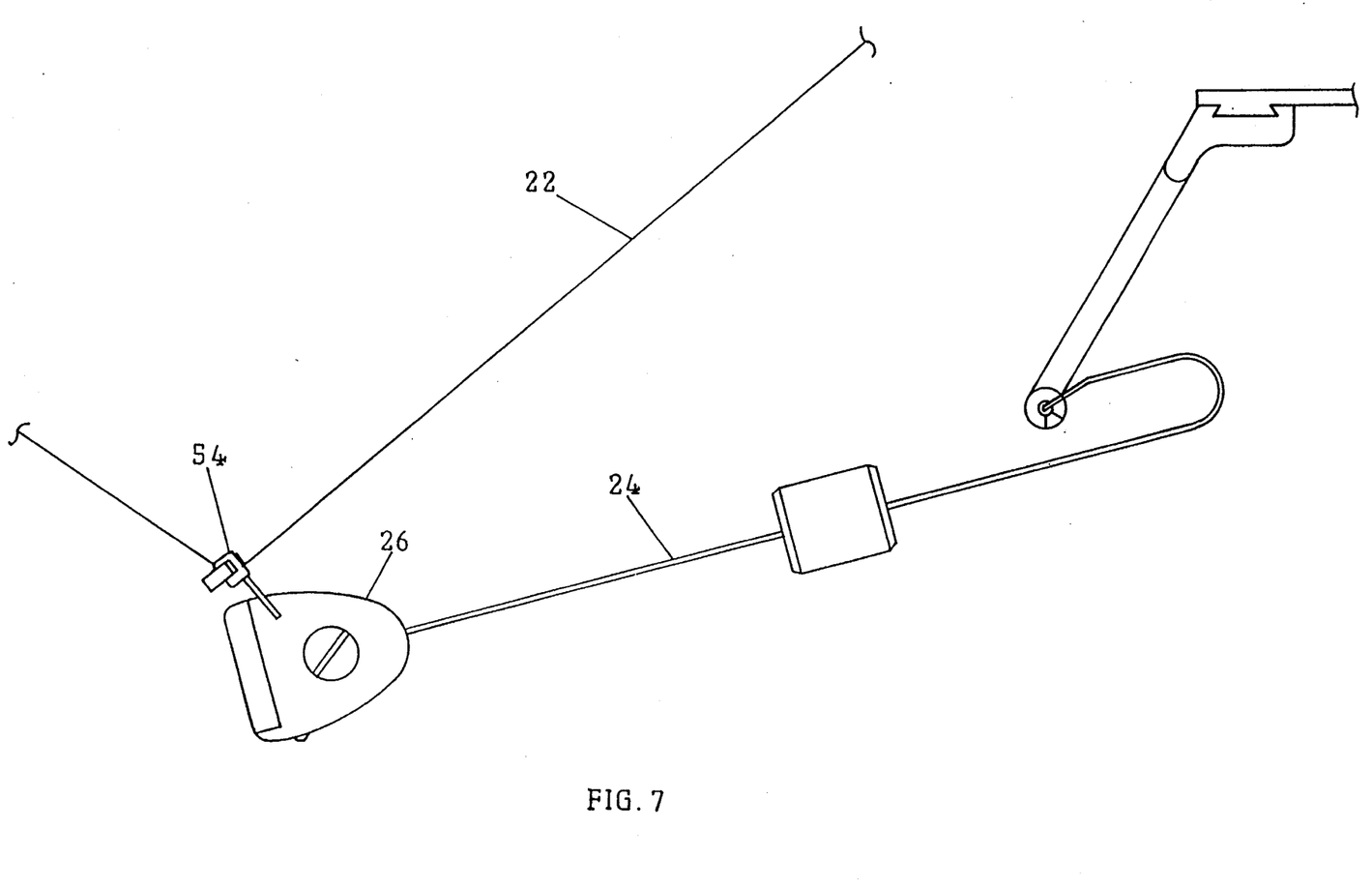
FIG. 7 shows an elevational side view of the bite indicator shown in FIG. 1 in greater detail.
Figure 8:
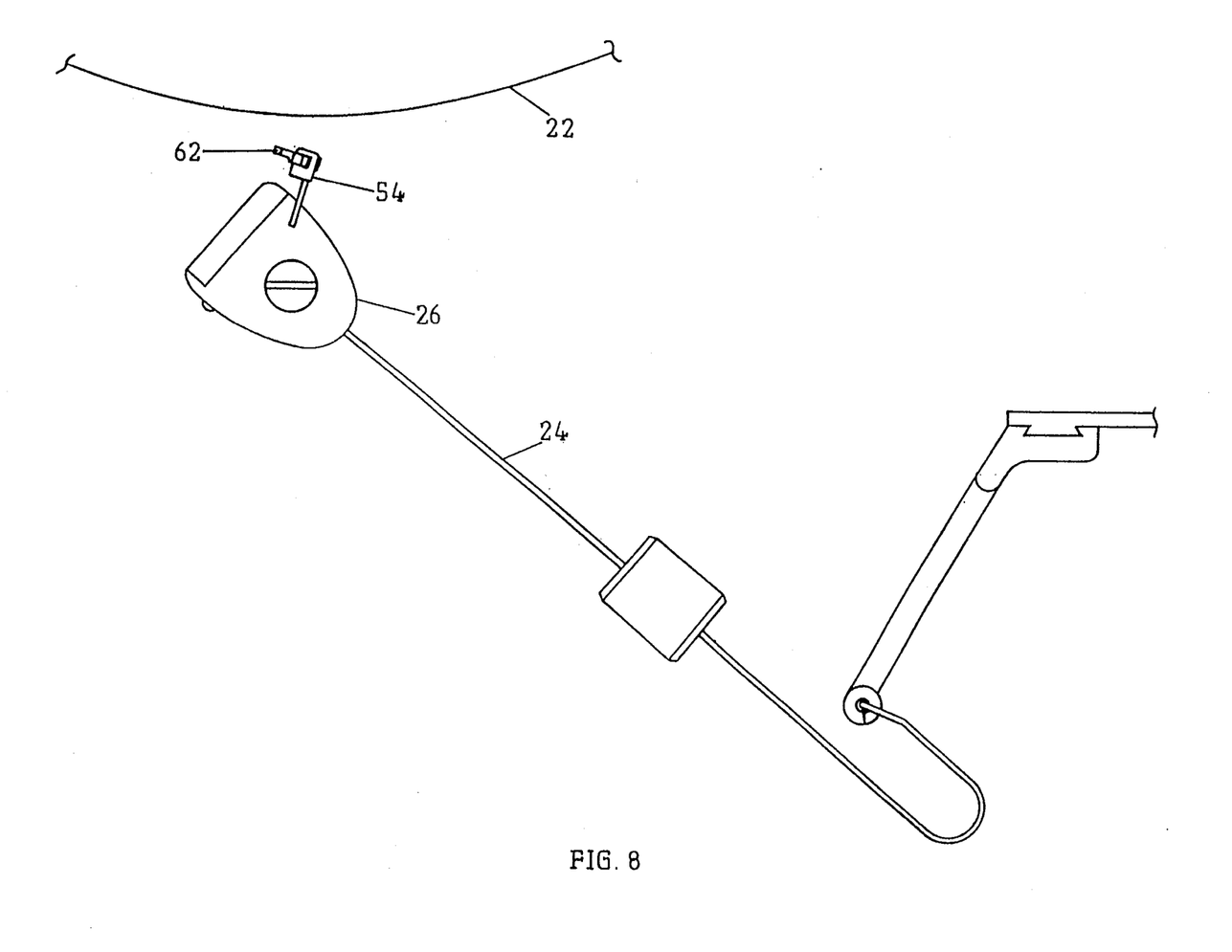
FIG. 8 shows an elevational side view of the bite indicator as shown in FIG. 7 after a strike on the fishing line.

FIGS. 7 and 8 show the action of the line engagement device 54 when in use. FIG. 7 shows the line engagement means with the gate shut, holding the fishing line 22. The weight exerted on the line through the head causes a V-shape in the line 22 as it passes under the gate.

When a fish bites, the tension in the line 22 increases and the arm 24 of the bite indicator moves upwards towards the rod (not shown in FIG. 7 or FIG. 8). Similarly if the angler using the rod wishes to recast the line the arm 24 of the bite indicator will be moved upwards as the lifts the rod off its stand (not shown in FIG. 7 or FIG. 8). As the arm of the bite indicator is moved upwards, a point is reached when the line 22 pulls the gate 62 of the line engagement device 54 open. The line 22 is thus freed from the bite indicator and the angler is free to take whatever actions are necessary.

The orientation of the line engagement device 54 may be adjusted by loosening the interlocking halves of the head 26 by unscrewing the screw 80, adjusting the device 54, and then tightening the screw 80. This will adjust the level to which the arm must be raised before the line will open the gate.

Numerous modifications and variations to the described embodiment can be produced without taking the bite indicator outside the scope of the present invention such as changing the angle of the arm 24 at which the gate opens, by having the angle between the stem and the base of the body of the line engagement device other than 90°.

In another modification, by way of example only, the illustrated engagement means might be fixed on the end of a springy arm instead of the relatively rigid arm 24, to avoid the need for a pivotable attachment of the arm 24 to the pivot member 16.

I claim:

1. A bite indicator for use in indicating a bite made by a fish on a line of a fishing rod, comprising support means which are fixed relative to the ground when the indicator is in use, an arm which is attached to the support means and which is free to swing upwardly and downwardly relative to the support means in dependence upon the line tension whereby swinging of the arm provides a visible indication of a fish bite on the line when the indicator is in use, and line engagement means which is secured to the arm and which is adapted to engage said line when the indicator is in use, whereby an alteration in the line tension will cause the line engagement means to have a vertical component of movement as the arm swings in dependence upon the line tension, wherein the line engagement means comprises a body which is provided with a channel and a pivotable gate which is pivotable between a closed position in which it extends over the channel, to form a closed loop with the body surrounding said line when the bite indicator is in use, and an open position in which said line is free to move out of the channel, the body being provided with angle-retaining means by which said body is retained at a given angle relative to the arm so that tension in said line is inhibited from opening the gate whilst the arm remains below a predetermined level, but tends to open the gate after the arm swings to a position in an upward direction beyond a predetermined level, whereby the line can be readily disengaged from the engagement means by a lifting of the rod.

2. A bite indicator according to claim 1, in which the gate can be moved by finger pressure, so as to open the gate thus allowing entry of the line, and then closed so that the engagement means completes a loop around the line.

3. A bite indicator according to claim 1, in which resistance means are provided on the engagement means whereby a predetermined torque needs to be applied to the gate in order to open it.

4. A bite indicator according to claim 3, in which the resistance means may be adjustable to vary the torque required to open the gate.

5. A bite indicator according to claim 1, in which the angle-retaining means is adjustable to vary the level to which the arm must be raised before said line will open the gate.

6. A bite indicator according to claim 1, in which the gate is provided with a rounded saddle shape on the side of the gate which faces the channel when the gate is in the closed position.

7. A bite indicator according to claim 1, in which the said body is provided with a rounded saddle shape in a base region of the channel.

8. A bite indicator according to claim 1, in which the gate has a narrowed neck portion, adjacent to said line when the indicator is in use.

9. A bite indicator according to claim 1, in which the material from which the gate is constructed comprises a low frictional material.

10. A bite indicator according to claim 9, in which the material of the gate comprises a plastics material or a ceramics material.

11. A bite indicator according to claim 1, in which the material with which the gate is coated is a low friction material.

12. A bite indicator according to claim 11, in which the material of the gate comprises aluminium which is chromium plated.

13. A bite indicator, for use in indicating a bite made by a fish on a line of a fishing rod, comprising support means which are fixed relative to the ground when the indicator is in use, an arm which is attached to the support means and which is free to swing upwardly and downwardly relative to the support means in dependence upon the line tension whereby swinging of the arm provides a visible indication of a fish bite on the line, when the indicator is in use, and line engagement means which is secured to the arm and which is adapted to engage said line when the indicator is in use, whereby an alteration in the line tension will cause the line engagement means to have a vertical component of movement as the arm swings in dependence upon the line tension, wherein the line engagement means comprises a body which is provided with a channel and a pivotable gate which is pivotable between a closed position in which it extends over the channel, to form a closed loop with the body surrounding said line when the bite indicator is in use, and an open position in which said line is free to move out of the channel, the body being provided with angle-retaining means by which said body is retained at a given angle relative to the arm so that tension in said line is inhibited from opening the gate while the arm remains below a predetermined level, but tends to open the gate after the arm swings to a position in an upward direction beyond a predetermined level, whereby the line can be readily disengaged from the engagement means by a lifting of the rod, and in which the angle-retaining means is adjustable to vary the level to which the arm must be raised before tension in said line will open the gate.

* * * * *